US007853665B1

(12) United States Patent
Veeraraghavan et al.

(10) Patent No.: US 7,853,665 B1
(45) Date of Patent: Dec. 14, 2010

(54) CONTENT TARGETING WITH AUDIENCES

(75) Inventors: Venkatesh Veeraraghavan, Seattle, WA (US); Lin Huang, Redmond, WA (US); Targo Tennisberg, Bothell, WA (US); Nathan Fink, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1102 days.

(21) Appl. No.: 10/782,563

(22) Filed: Feb. 18, 2004

(51) Int. Cl.
*G06F 15/16* (2006.01)
*G06F 3/00* (2006.01)
(52) U.S. Cl. .................. 709/217; 715/700; 707/700
(58) Field of Classification Search ........... 709/217; 715/700; 707/1
See application file for complete search history.

(56) References Cited

U.S. PATENT DOCUMENTS

| | | | |
|---|---|---|---|
| 6,438,594 B1 * | 8/2002 | Bowman-Amuah | 709/225 |
| 6,460,141 B1 * | 10/2002 | Olden | 726/4 |
| 6,487,600 B1 * | 11/2002 | Lynch | 709/229 |
| 6,606,652 B1 * | 8/2003 | Cohn et al. | 709/217 |
| 6,901,403 B1 * | 5/2005 | Bata et al. | 1/1 |
| 7,149,959 B1 * | 12/2006 | Jones et al. | 715/234 |
| 7,171,455 B1 * | 1/2007 | Gupta et al. | 709/219 |
| 7,181,438 B1 * | 2/2007 | Szabo | 1/1 |
| 7,430,754 B2 * | 9/2008 | Speare et al. | 726/1 |
| 7,433,944 B2 * | 10/2008 | Kanada et al. | 709/223 |
| 7,437,427 B1 * | 10/2008 | Veeraraghavan et al. | 709/217 |
| 7,454,462 B2 * | 11/2008 | Belfiore et al. | 709/203 |
| 7,742,997 B1 * | 6/2010 | Brenner et al. | 705/300 |
| 2002/0010798 A1 * | 1/2002 | Ben-Shaul et al. | 709/247 |
| 2002/0049749 A1 * | 4/2002 | Helgeson et al. | 707/3 |
| 2002/0095399 A1 * | 7/2002 | Devine et al. | 707/1 |
| 2003/0028451 A1 * | 2/2003 | Ananian | 705/27 |
| 2003/0069748 A1 * | 4/2003 | Shear et al. | 705/1 |
| 2003/0101451 A1 * | 5/2003 | Bentolila et al. | 725/34 |
| 2003/0120593 A1 * | 6/2003 | Bansal et al. | 705/39 |
| 2003/0208505 A1 * | 11/2003 | Mullins et al. | 707/102 |
| 2004/0019656 A1 * | 1/2004 | Smith et al. | 709/217 |
| 2004/0088348 A1 * | 5/2004 | Yeager et al. | 709/202 |
| 2006/0140134 A1 * | 6/2006 | O'Brien et al. | 370/252 |

OTHER PUBLICATIONS

Danyel Fisher et al.; "*Social and Temporal Structures in Everyday Collaboration*"; Apr. 24-29, 2004; vol. 6, No. 1; pp. 551-558.

* cited by examiner

*Primary Examiner*—William C Vaughn, Jr.
*Assistant Examiner*—Muktesh G Gupta
(74) *Attorney, Agent, or Firm*—Merchant & Gould P.C.

(57) ABSTRACT

The present invention provides a system and method for targeting content to audiences. The audience is defined by rules that may be based on properties as well as organizational structure associated with the users. Each of the rules is compiled to determine the group of members belonging to the rule. Logical operators are then applied to the groups to determine the audience membership. Compiling the rules enhances performance as the rules do not have to be run each time. Instead, a simple check against the rules results is performed. The rules making up the audience may be compiled at predetermined times in order to keep the audience up-to-date. Audiences are then selected and tagged to content so that the content may be viewed by the selected audiences.

18 Claims, 15 Drawing Sheets

Matrix (SharePoint Portal Server 2003)
View Audience Membership of BPGfte

This page shows you the list of profiles that match the membership of an Audience.

Last Compiled: 02/12/2004 1:59PM
Members: 5

| Account Name | Preferred Name | Email |
| --- | --- | --- |
| Jeff | Jeff Jones | jeff@company.com |
| Frank | Frank Samuel | frank@company.com |
| Sandy | Sandy Ruben | sandy@company.com |
| Alice | Alice Kratz | alice@company.com |
| Mark | Mark Magers | mark@company.com |

*Fig. 12*

CONTENT TARGETING WITH AUDIENCES

BACKGROUND OF THE INVENTION

Many organizations target content to particular individuals in order to provide them with relevant content. In order to target the content to a specific group of users, the organization determines a set of criteria that is associated with the content. When a user matches the set of criteria then the content is targeted toward them. For example, the set of criteria may be based on the user's demographic area, age, job, or some other aspect. Creating the group of users to which the content is targeted, however, can be very cumbersome. Generally, someone within an organization manually selects each of the members. For example, contacts may be used to create distribution lists. Not only is creating the lists difficult and time consuming, the lists typically become inaccurate after a period of time.

SUMMARY OF THE INVENTION

The present invention is directed towards providing a system and method for targeting content to an audience.

According to one aspect of the invention, rules are created to define the audience. The rules may be based on properties as well as organizational structure associated with individuals.

According to another aspect of the invention, the rules may be linked by operators. The linking allows more complex audience definitions to be formed. For example, logical operators may be used to link the rules.

According to another aspect of the invention, the rules are first compiled individually to create sets of member. The operators are then applied to the created sets of members to determine the final audience membership.

According to yet another aspect of the invention, the audience rules may be compiled at predetermined times. This helps to ensure that the audience membership is up-to-date. For example, the rules may be compiled daily, on certain days, weekly, monthly, or any other time period.

According to still yet another aspect of the invention, audiences are tagged to content. More than one audience may be tagged to the content. The tagging helps to filter the content to be delivered to the audience.

According to another aspect of the invention, a web interface provides access to the targeted content. For example, a new employee will see new employee information when they access their home page.

BRIEF DESCRIPTION OF THE DRAWINGS

FIG. 10 shows an exemplary manage audience definitions screen;

FIG. 11 illustrates an exemplary edit audience definition screen;

FIG. 12 shows an exemplary view audience membership screen;

DETAILED DESCRIPTION OF THE PREFERRED EMBODIMENT

Generally, the present invention is directed towards providing a system and method for targeting content to audiences. The audience is defined by rules that may be based on properties as well as organizational structure associated with the users. Each of the rules is compiled to determine the group of members belonging to the rule. Logical operators are then applied to the groups to determine the audience membership. The rules making up the audience may be compiled at predetermined times in order to keep the audience up-to-date. Audiences are then selected and tagged to content so that the content may be viewed by the selected audiences.

Illustrative Operating Environment

Figure 1:
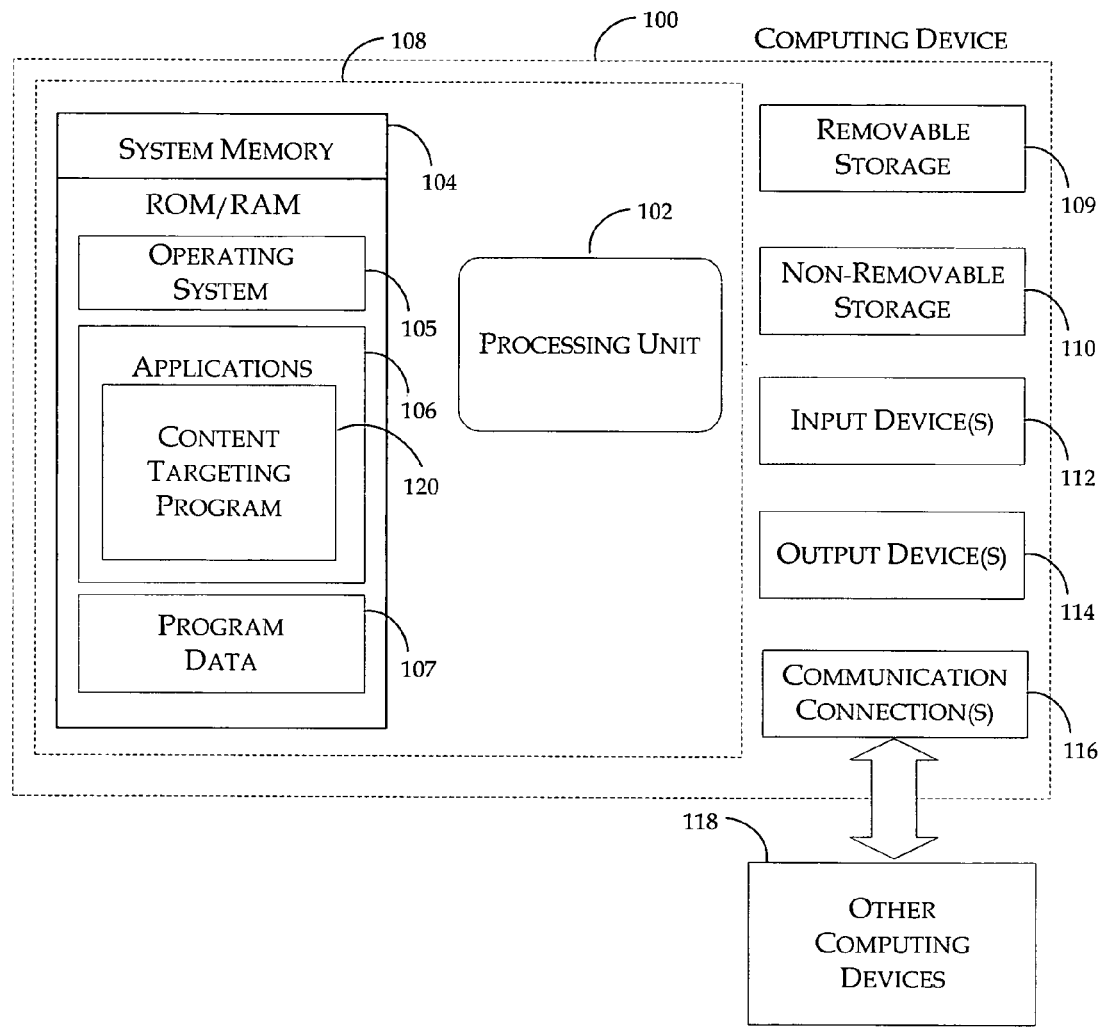
FIG. 1 illustrates an exemplary computing device that may be used according to exemplary embodiments of the present invention.

With reference to FIG. 1, one exemplary system for implementing the invention includes a computing device, such as computing device 100. Computing device may be configured as a client, a server, mobile device, or any other computing device that interacts with targeted content in a network based target content system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a content targeting application 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s)

112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Content Targeting System

Figure 2:
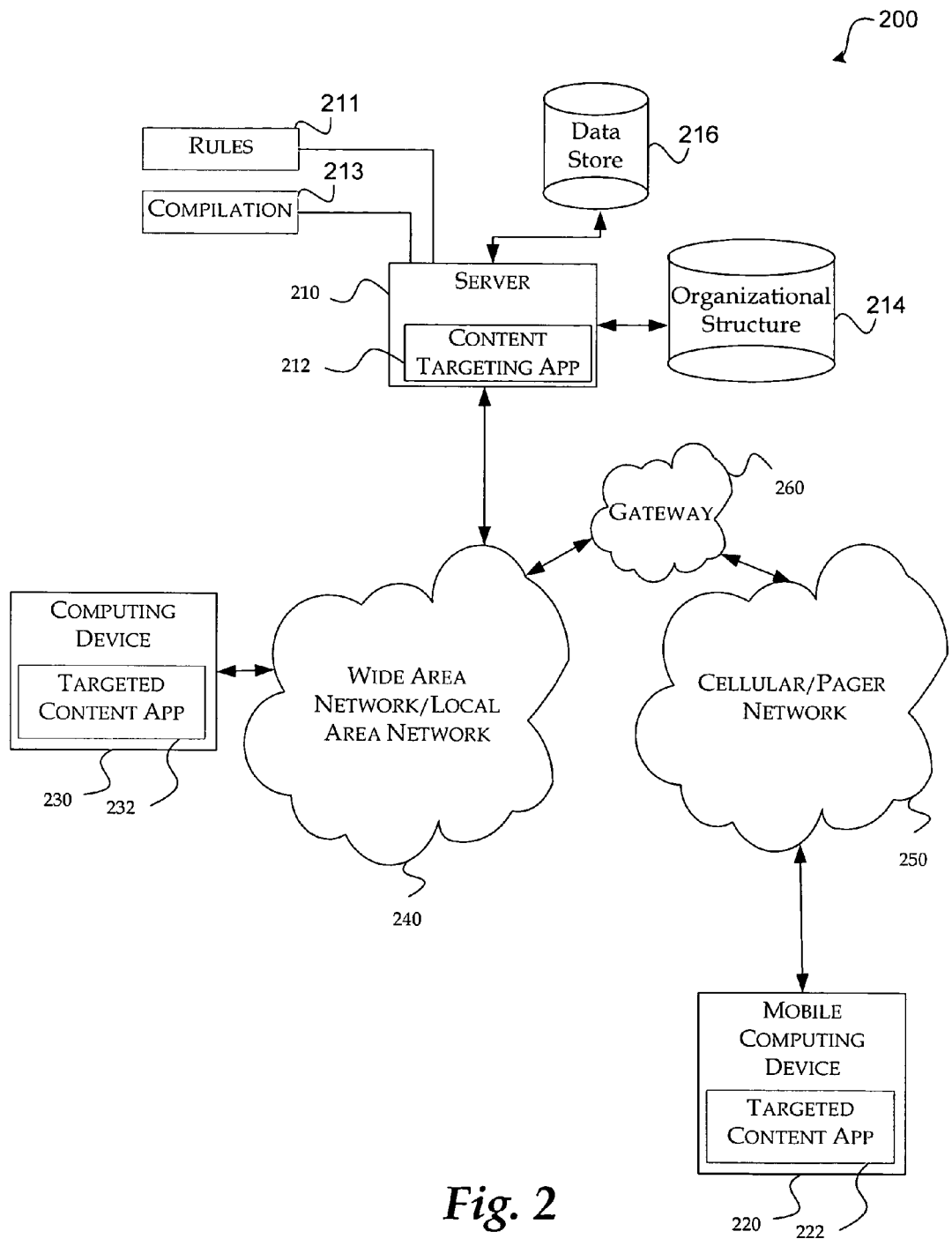
FIG. 2 is a functional block diagram generally illustrating a content targeting system.

FIG. 2 is a functional block diagram generally illustrating a content targeting system 200, in accordance with aspects of the invention. Server 210, computing device 230, and mobile computing device 220 may be computing devices such as the one described above in conjunction with FIG. 1.

Server 210 runs content targeting application 212. Generally, targeting application 212 is configured provide data and operations relating to providing content targeted to audiences members that is accessed by computing devices, such as computing device 230 and computing device 220. The targeted content stored at data store 216, or some other data store (not shown) may be transmitted over a wide area network (WAN)/local area network (LAN) 340 or a cellular pager/network to the clients. One example of a WAN is the Internet that connects millions of computers over a host of gateways, routers, switches, hubs, and the like. An example of a LAN is a network used to connect computers in a single office. A WAN may connect multiple LANs.

A targeted content application, such as 222 or 232 residing on mobile device 220 or computing device 230, is configured to receive targeted content from server 210. Applications 222 and 232 and targeting application 212 may communicate using any one of several client-server protocols.

Cellular/pager network 250 is a network responsible for delivering messages to and receiving messages from wireless devices. The cellular/pager network 250 may include both wireless and wired components. For example, cellular/pager network may include a cellular tower that is linked to a wired telephone network. Typically, the cellular tower carries communication to and from mobile devices, such as cell phones, notebooks, pocket PCs, long-distance communication links, and the like.

Gateway 260 routes messages between cellular/pager network 250 and WAN/LAN 240. For example, server 210 may send targeted content to mobile computing device 220 that is associated with a particular audience member that is tagged to receive the content. Gateway 260 provides a means for transporting the message from the WAN/LAN 340 to cellular/pager network 250. Conversely, a user with a device connected to a cellular network may be accessing the Web. Gateway 260 allows hyperlink text protocol (HTTP) messages to be transferred between WAN/LAN 240 and cellular/pager network 250. According to one embodiment, content targeting application 212 provides HTML code to the targeted content applications on the clients that enables their browser to display the targeted content.

Audiences are defined by a set of rules (211). The rules can include individuals who are members of pre-existing lists or groups as well as define a rule based on an organizational structure. Any number of rules may be combined to define a specific audience. Once the Audience is created, content targeting system 200 is used to target the content to the audience.

Audiences to receive the targeted content may be created using a number of data stores, such as data store 216 and organizational structure data store 214. The data sources may include items, such as distribution lists, security groups, and organizational structure. Generally, within an organization, there are two places where members for audiences already exist. The first is based on distribution lists (mailing lists), and the second is security groups, such as NT security groups. Using these pre-existing definitions allows audiences to be created quickly. For instance, a geography based distribution list could be imported and used to provide locale specific content, such as 401K information for all US employees. Combining these lists with organizational structure helps to target content to specific groups of users.

The organizational structure may be used to find individuals within an organization based on their role. For example, the organizational structure could be used to find all people who report under a vice president within a specific division and who have certain characteristics, such as all people within the organization whose title is 'Attorney.'

Each rule defining the audience may be combined using any combination of logical operators, such as (AND, OR, and (,)), to link the rules and create an audience definition. For example, the following is an exemplary rule grammar: Organizational Rule::=Rule|'(' Rule ')'⊕Rule 'AND' Rule|Rule 'OR' Rule.

According to one embodiment of the invention, there are three different rule types. The first rule type is a property query that may be expressed as: Rule::= <property><operator><value>. This is an attribute based rule type. The property includes items associated with a user profile. For example the property may include items such as: last name, first name, telephone number, title, and the like. The operator is selected from a group of logical operators, including: EQUALS; NOT EQUALS; LESS THAN; LESS THAN OR EQUAL; GREATER THAN; GREATER THAN OR EQUAL; CONTAINS; and NOT CONTAINS. According to one embodiment, the operators are selected based on a property data type. The <value> is supplied by the user. An exemplary property rule is: Last Name EQUALS Smith or Title CONTAINS "Program Manager."

The second rule type is the 'MEMBER OF' rule type. This rule is a member type rule. This rule type may be expressed as: 'MEMBER OF'<Distribution List/Security Group>. Pre-existing groups can be used as Audience definitions using this rule type. Audience definitions can be created explicitly using the rule 'Name ==<Username>. The MEMBER OF rules type allows individuals to be selected from particular audiences. For example, audience members could be selected from a new employees distribution list or security group.

The third rule type is the reports under rule type. This rule type may be expressed as: 'REPORTS UNDER'<user>. This type of rule is an organizational rule type and <user> is a user who exists within the organization.

The Reports Under operator is used to create organization based Audiences such as all reports of the Division Vice-President. According to one embodiment, the information used to derive this audience definition is stored in the user profile database. The information may be stored in other locations, such as an external directory. To compute this definition, the Audience definition compiler uses the "Manager" system property. The person on whom the Reports Under rule is applied will show up in the list of people in that Audience because we expect this feature to be used for creating Audiences for entire divisions or teams. According to one embodiment of the invention, a Microsoft Active Directory is accessed to determine the user profiles which is then used to create the organizational structure. The organizational structure, however, may be created from any data source containing the relevant user information.

Another component of the content targeting system is compilation component 213. Compilation component 213 compiles the list of rules defining the audience to determine the audience members. The compilation occurs in two stages. In the first stage, each of the rules is individually compiled to determine members that meet the rule conditions. In the second stage, the logical operators connecting the list of rules is applied in the order given in the audience definition to create the final group comprising the audience. According to one embodiment, the rules, compiled rule results, targeted link lists and related data are stored in a SQL database.

For example, a rule can be created, such as "REPORTS UNDER Vice President of Program Development AND whose Title EQUALS "Program Manager." In the present example, stage 1 creates two sets of people. The first set include all people who report under the Vice President of Program Development. The second set includes all people whose Title is "Program Manager." In stage 2, the logical operator AND is applied between the two sets. The audience is the intersection between the sets.

According to one embodiment, prior to evaluating the REPORTS UNDER rule, a preprocessing step evaluates the organization hierarchy and assign each node in the tree a value. Performing this step helps to express the REPORTS UNDER rule as a simple SQL query instead of a recursive set of queries.

Running a query to determine who is affected by an audience rule can take a considerable amount of time. Therefore, according to one embodiment of the invention, the results of the rule queries are computed in advance and stored in data store 216 for easy access.

Figure 3:
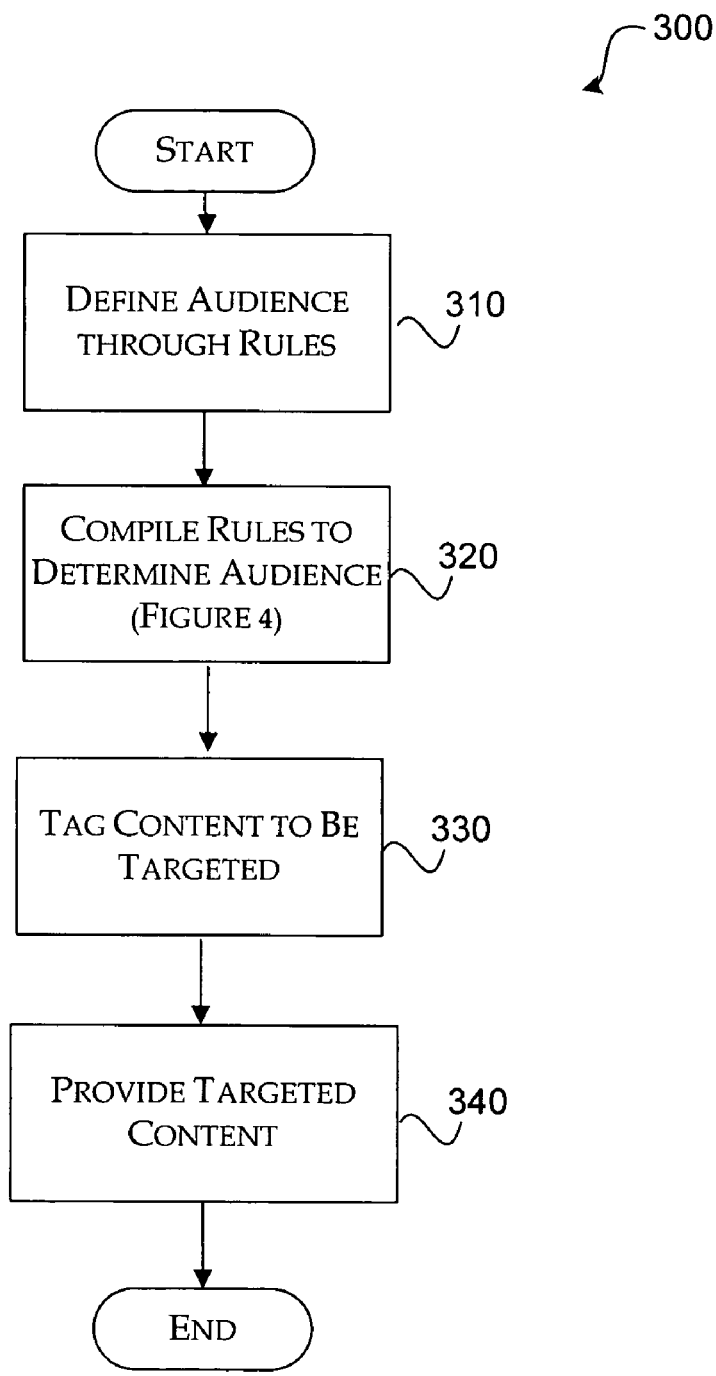
FIG. 3 illustrates a process for targeting content to an audience.

FIG. 3 illustrates a process for targeting content to an audience, in accordance with aspects of the present invention. After a start block, the process moves to block 310 where rules are created to define an audience. As discussed above, the rules may be based on organizational structure as well as attributes associated with individuals.

Moving to block 320, the rules are compiled to determine the audience members. Each of the individual rules making up the audience definition is compiled creating a group of people. The logical operators connecting the rules are then applied to create the final audience. The rules may be compiled at a predetermined frequency in order to keep the audience membership current. For example, the rules could be compiled daily, weekly, hourly, monthly, or some other frequency.

Flowing to block 330 the content to be targeted to an audience is tagged. The tag is used to indicate that the audience should receive the content. More than one audience may be tagged to the content.

Next, at block 340 the targeted content is provided to the appropriate audiences. According to one embodiment, the targeted content is presented through a web interface. The process then steps to an end block.

Figure 4:
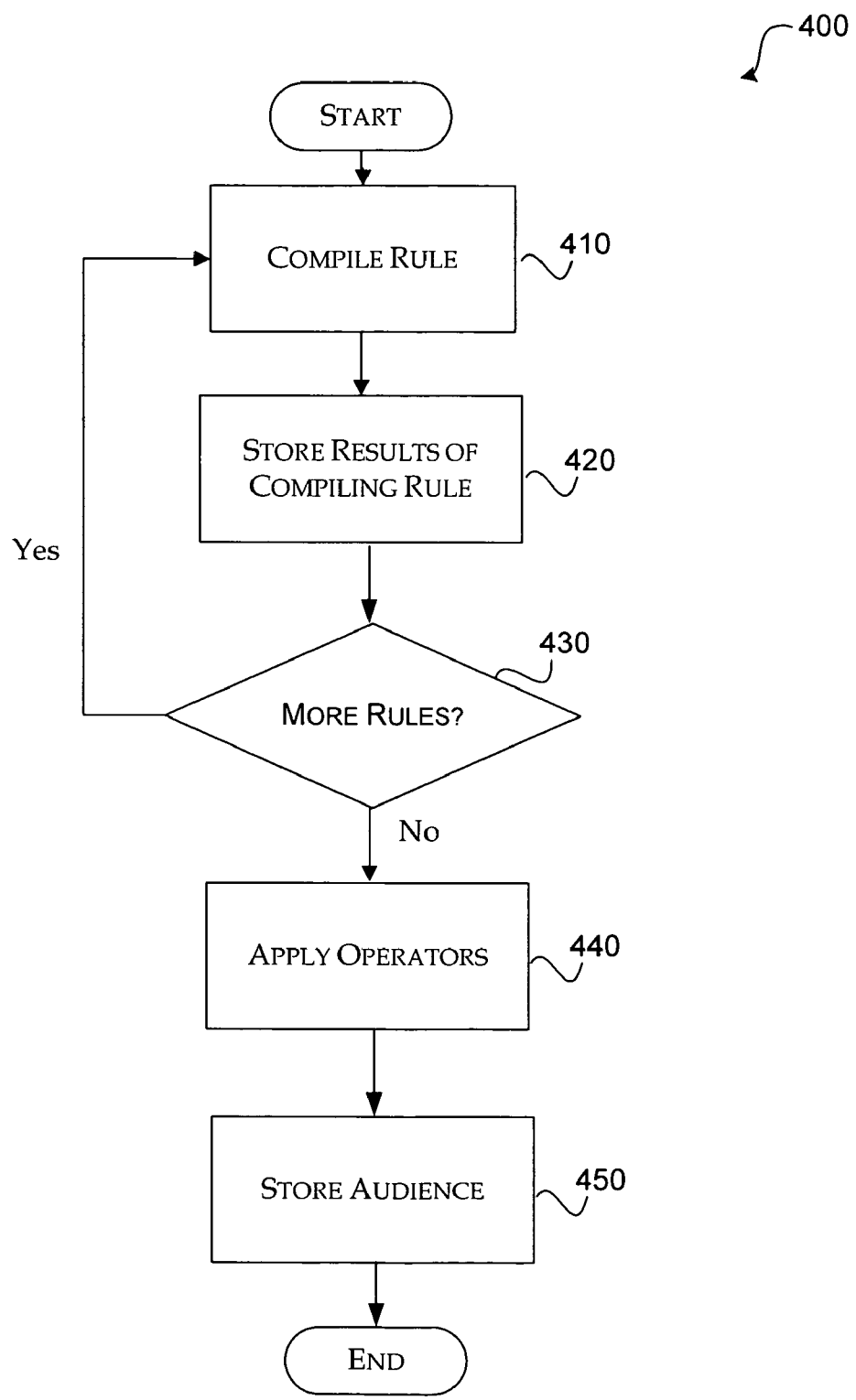
FIG. 4 illustrates a process for compiling rules to determine audience membership.

FIG. 4 illustrates a process for compiling rules to determine audience membership, in accordance with aspects of the present invention. After a start block, the process flows to block 410 where the first rule defining the audience is compiled. The compilation of the single rule determines members meeting the criteria of that rule. Moving to block 420, the members obtained from applying the rule are stored in a data store. Flowing to decision block 420, a determination is made as to whether there are any more rules defining the audience. When there are more rules, the process returns to block 410. When there are not more rules, the process flows to block 440 where the logical operators linking the rules are applied to the results of each individual rule compilation. In other words, each rule represents a set of people and the operators represent the union and intersection of the sets of people. Moving to block 450, the audience members are stored. The process then moves to an end block.

Figure 5:
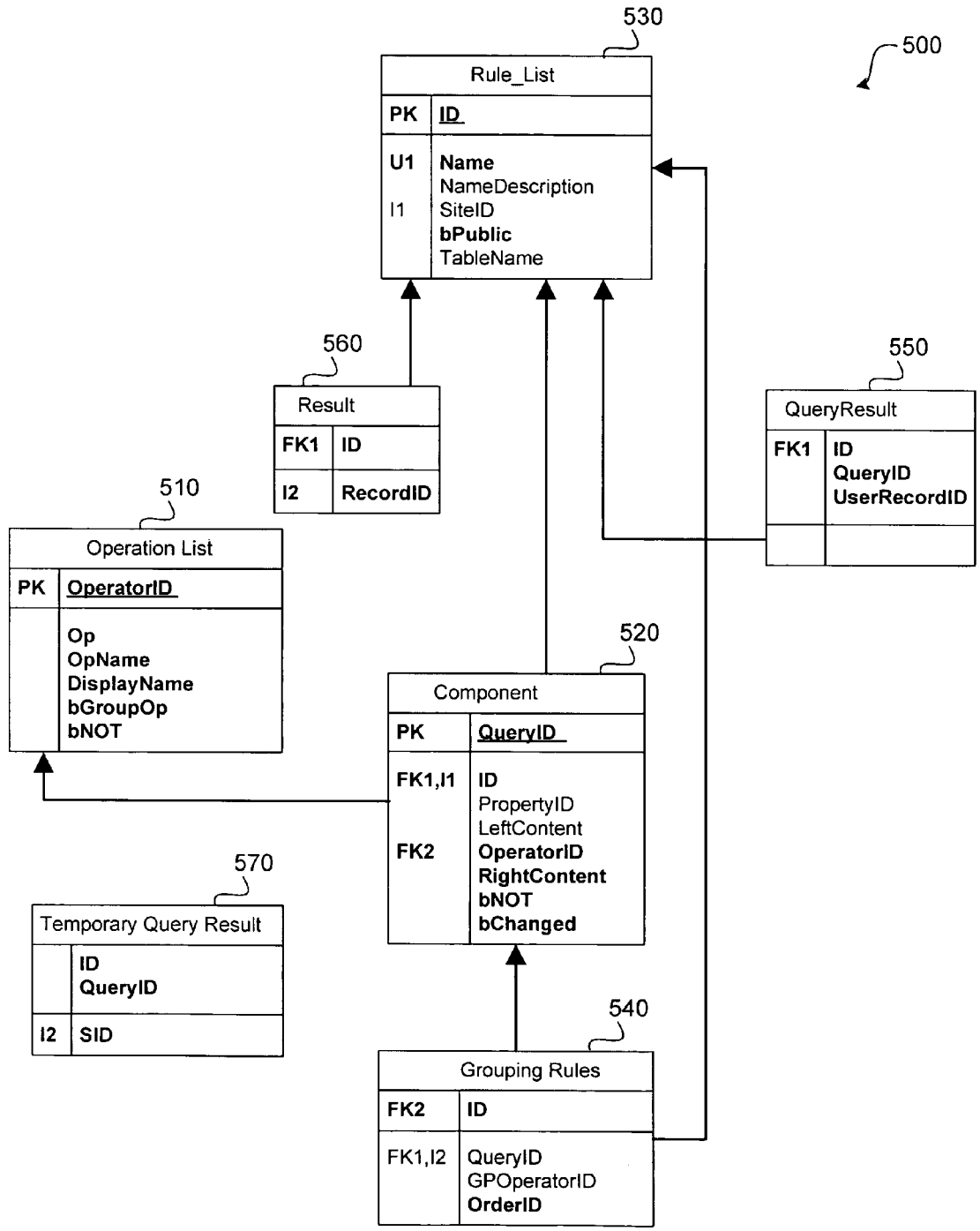
FIG. 5 illustrates a block diagram of a content targeting database structure.

FIG. 5 illustrates a block diagram of a content targeting database structure, in accordance with aspects of the present invention.

Operation list 510 stores the supported operations that are applied to the rules. According to one embodiment, the list of operations include: EQUALS; NOT EQUALS; LESS THAN; LESS THAN OR EQUAL; GREATER THAN; GREATER THAN OR EQUAL; CONTAINS; and NOT CONTAINS.

Component box 520 includes the elementary rules making up the audience definition without the logical grouping operators.

Rule list 530 contains the list of complete rules defining the audience.

Grouping rules 540 contains the rule grouping information to be applied to the rules listed in component 520. For example, (<rule1> AND <rule2> OR <rule3>).

Query result 550 contains the members resulting from applying the rules listed in component 520.

Result 560 contains the list of audience members as determined by applying the operators to the query results.

Temporary query result 570 is a temporary query result from applying the rules listed in component 520.

In order to simplify creating audiences and targeting content, many different tools are provided to the user through a web-based interface to create and manage audiences.

Figure 6:
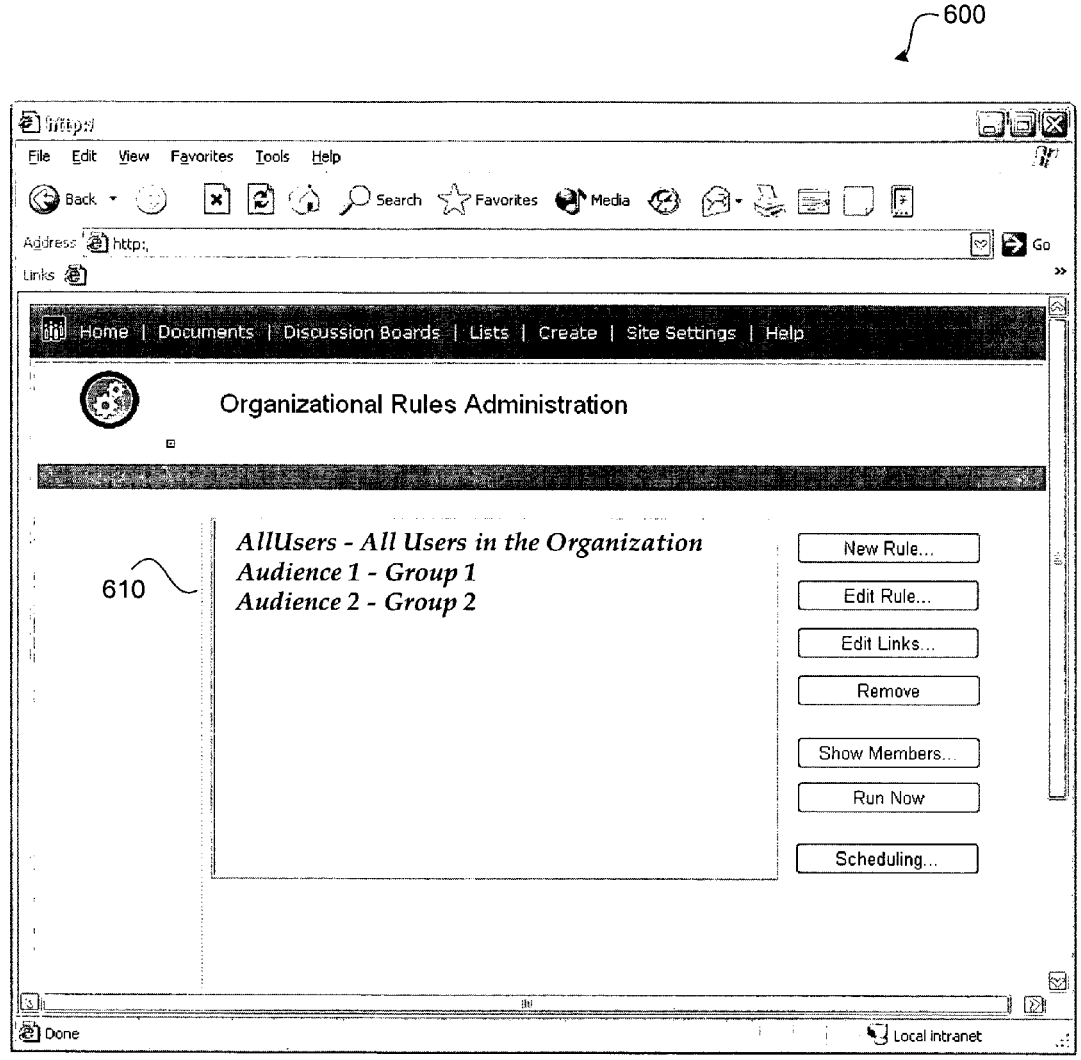
FIG. 6 illustrates an exemplary organizational rules administration screen.

FIG. 6 illustrates an exemplary organizational rules administration screen, in accordance with aspects of the invention. Screen 600 displays a list of existing organizational rules (610) defining audiences that are currently in the content targeting system. From screen 600, a user may select: the new rule button to add a rule; the edit rule button to edit an existing rule; the edit links button to edit associated links that are associated with a rule; the remove button to delete a rule; the show members button to show the members of the audience; the run now button to compile a rule; and the scheduling button to schedule the compilation of the rules.

Figure 7:
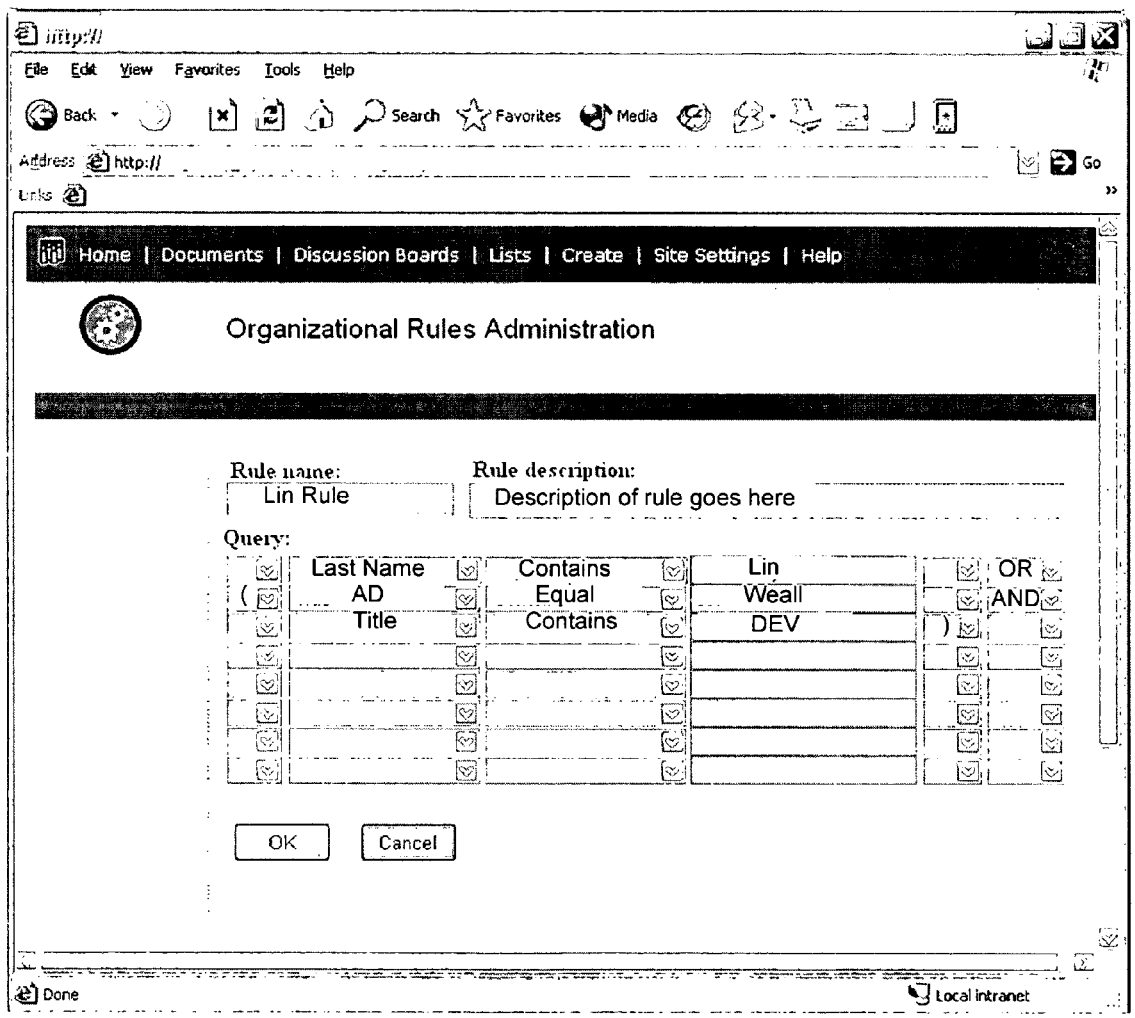
FIG. 7 illustrates an exemplary single organizational rule editing screen.

FIG. 7 illustrates an exemplary single organizational rule editing screen, in accordance with aspects of the invention. Editing screen 700 includes fields for the rule name, rule description, and a query UI that allows a user to input rule parameters.

Editing screen 700 is initially populated from audience definition stored in the rules database. The following is an exemplary rule storage definition for the rule displayed in FIG. 7.

| PropertyName | LeftContent | OpName | RightContent | OrderID |
|---|---|---|---|---|
| Last Name | NULL | Contains | Lin | 1 |
| NULL | NULL | OR | NULL | 2 |
| NULL | NULL | ( | NULL | 3 |
| NULL | AD | Equal | Weall | 4 |
| NULL | NULL | AND | NULL | 5 |
| Title | NULL | Contains | DEV | 6 |
| NULL | NULL | ) | NULL | 7 |

As can be seen, each operation is broken into discrete components within the database. When the user selects the OK button, the rule is validated. First, any blank clauses are removed from the rule. Next, blank fields are identified and shown as errors to the user. For example, "Missing "Property" in clause <1 . . . 5>"; "Missing a "Value"; and "Missing "AND/OR" between clause <1 . . . 5> and clause <1 . . . 5>." The number of open parenthesis is checked to determine if it is the same as the number of closed parenthesis. The type of the value is checked to ensure that it is the same as the type of attribute used. For example, a number attribute has a number in the value field. Type mismatch is also checked. For example, attribute <propname> expects "Value" of <type>.

According to one embodiment, after the rule is validated, the query is stored as an XML representation. The following is an exemplary XML format of the illustrated query:

<AUDIENCE ORGANIZATION_RULE>
<ORGANIZATION_RULE="Lin Rule">
<QUERY LeftContent="Last Name" Property="1" Operator="=" RightContent="lin">
</QUERY>
<QUERY GroupOperator="OR">
</QUERY>
<QUERY GroupOperator="(">
</QUERY>
<QUERY LeftContent="AD" Property="0" Operator="=" RightContent="weall">
</QUERY>
<QUERY GroupOperator="AND">
</QUERY>
<QUERY LeftContent="Title" Property="1" Operator="Contains" RightContent="DEV">
</QUERY>
<QUERY GroupOperator=")">
<QUERY>
</ORGANIZATION_RULE>
</AUDIENCE ORGANIZATION_RULE>

Figure 8:
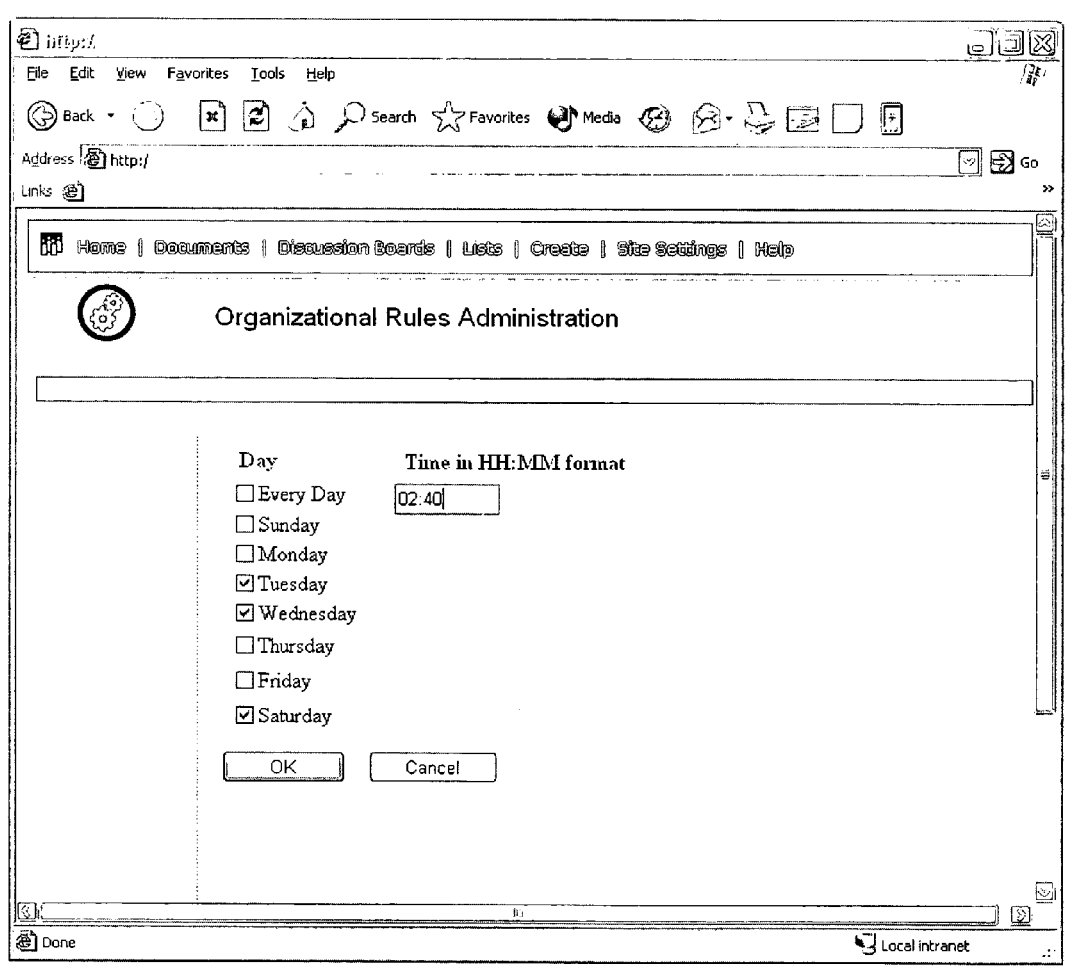
FIG. 8 shows an exemplary scheduling screen.

FIG. 8 shows an exemplary scheduling screen, in accordance with aspects of the invention. Selecting the scheduling button illustrated in FIG. 6 brings the user to scheduling screen 800.

Scheduling screen 800 allows an individual to specify how often and when the rules are compiled. As can be seen, the user has decided to compile the rules on Tuesday, Wednesday, and Saturday at 2:40 AM. Other time periods may also be specified. For example, the rule compilation may be scheduled to run daily, weekly, monthly, or on certain days at certain times.

According to one embodiment, the scheduling is processed as a SQL job. The SQL job enumerates the elementary rule definitions and then for Profile queries the SQL job executes the query over the profile table and for Active Directory (AD) queries the SQL job invokes the AD rules compiler.

According to another embodiment, the scheduling is processed using an NT scheduler. The rules are scheduled to be run by the NT scheduler and then for profile queries the NT scheduler invokes a stored procedure in a SQL server and for AD queries the NT scheduler invokes the AD rules compiler.

Figure 9:
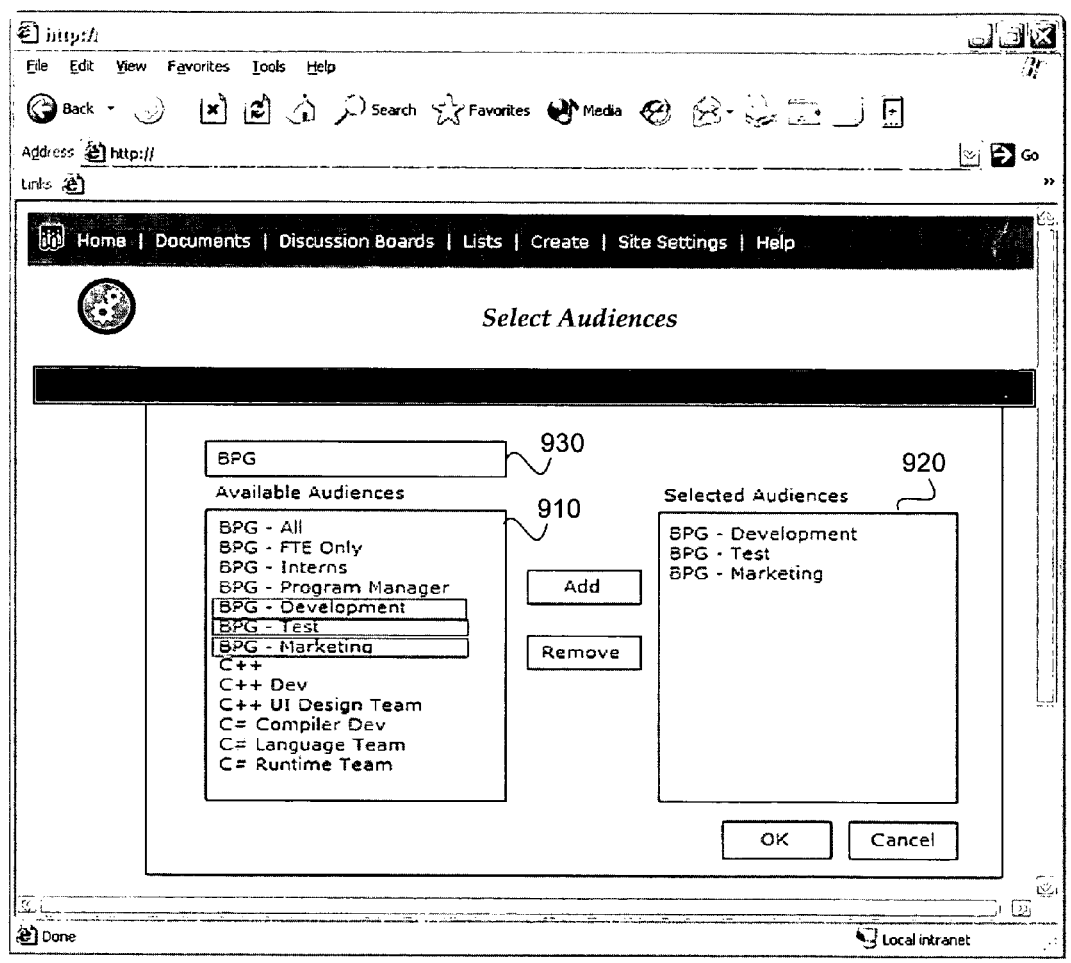
FIG. 9 illustrates an audience chooser.

FIG. 9 illustrates an audience chooser, in accordance with aspects of the present invention. A user is presented with audience screen 900 to choose the audiences to receive targeted content. When the audience chooser is instantiated for the first time, all stored audiences are shown in the available audiences list box (910).

Audiences are shown in only one of the list boxes (910 and 920). If an audience is moved from available audiences list box 910 to selected audiences list box 920, that audience, or group of audiences, is removed from the available audiences list box. In the example screen illustrated, the BPG—Development, BPG—Test, and BPG—Marketing audiences will be removed from available audiences list box 910 since they were added to selected audiences list box 920.

Search text may be entered into filter box 930 to narrow the list of available audiences. For example, in this scenario, the user has typed "BPG." The filter may contain all of the name or part of the name. The available audiences list is now shown with the first item that starts with text entered in the box. This list is updated upon the entry of every character into filter box 930.

Once the audiences are selected to receive the targeted content, the targeted content may be provided to the selected audience members. According to one embodiment, the targeted content is delivered over a network based web interface. For example, when an user accesses a web page having targeted content, all categories and listings that are applicable to the user are shown.

Figure 10:
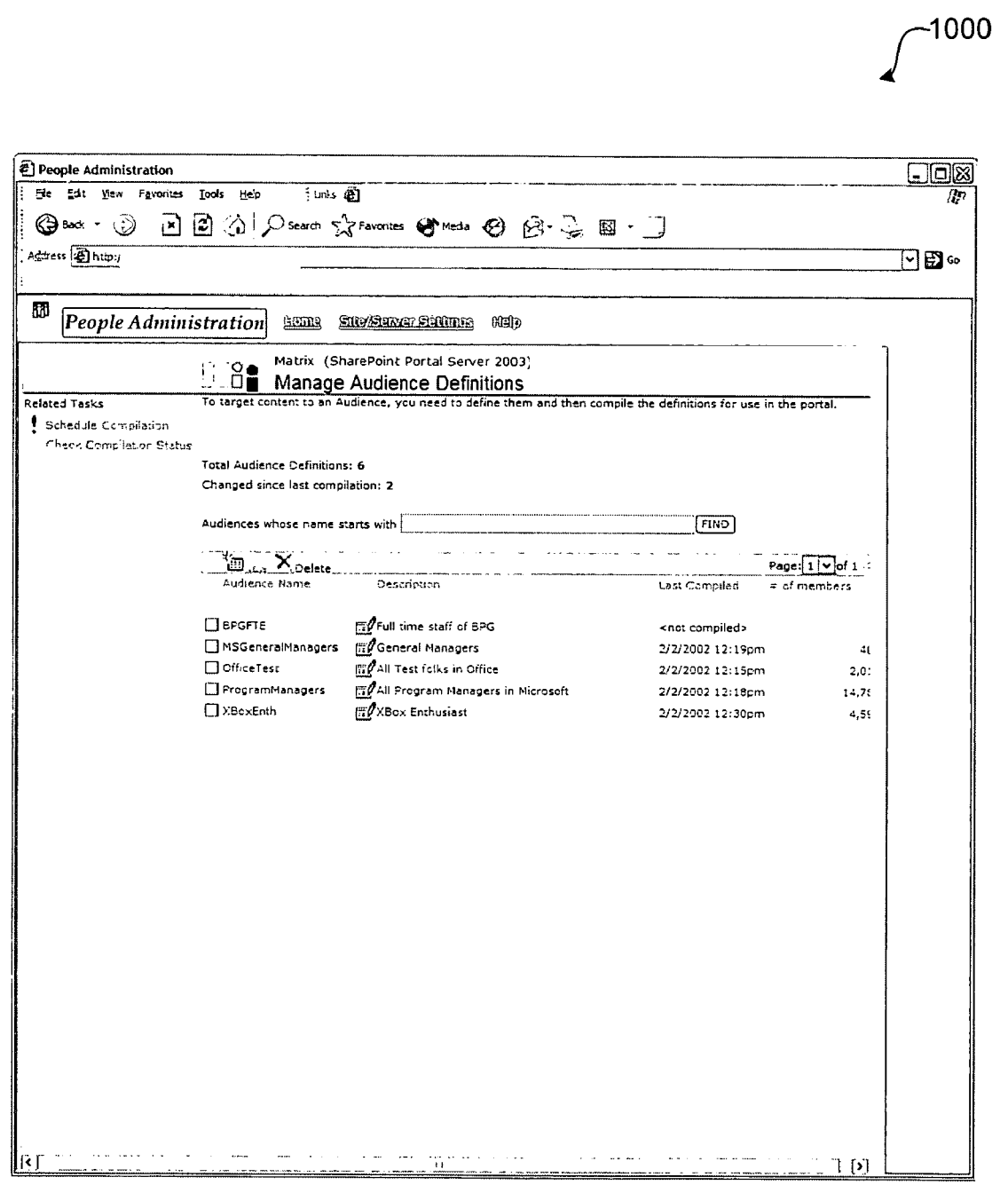

FIG. 10 shows an exemplary manage audience definitions screen, in accordance with aspects of the invention.

Manage audience definitions screen 1000 shows a list of audience definitions. Screen 1000 includes an audience name field, a description field, a last compiled field, and a number of members field.

The audience name lists the name of the audience. The description field provides a brief description of the audience. The last compiled field reports the status of the compilation for the audience. For example, the last compiled filed may indicate the time of the last compilation for the audience, or it may indicate that the audience has not been compiled. The number of members field indicates the number of members in the audience determined at the last compile time.

Figure 11:
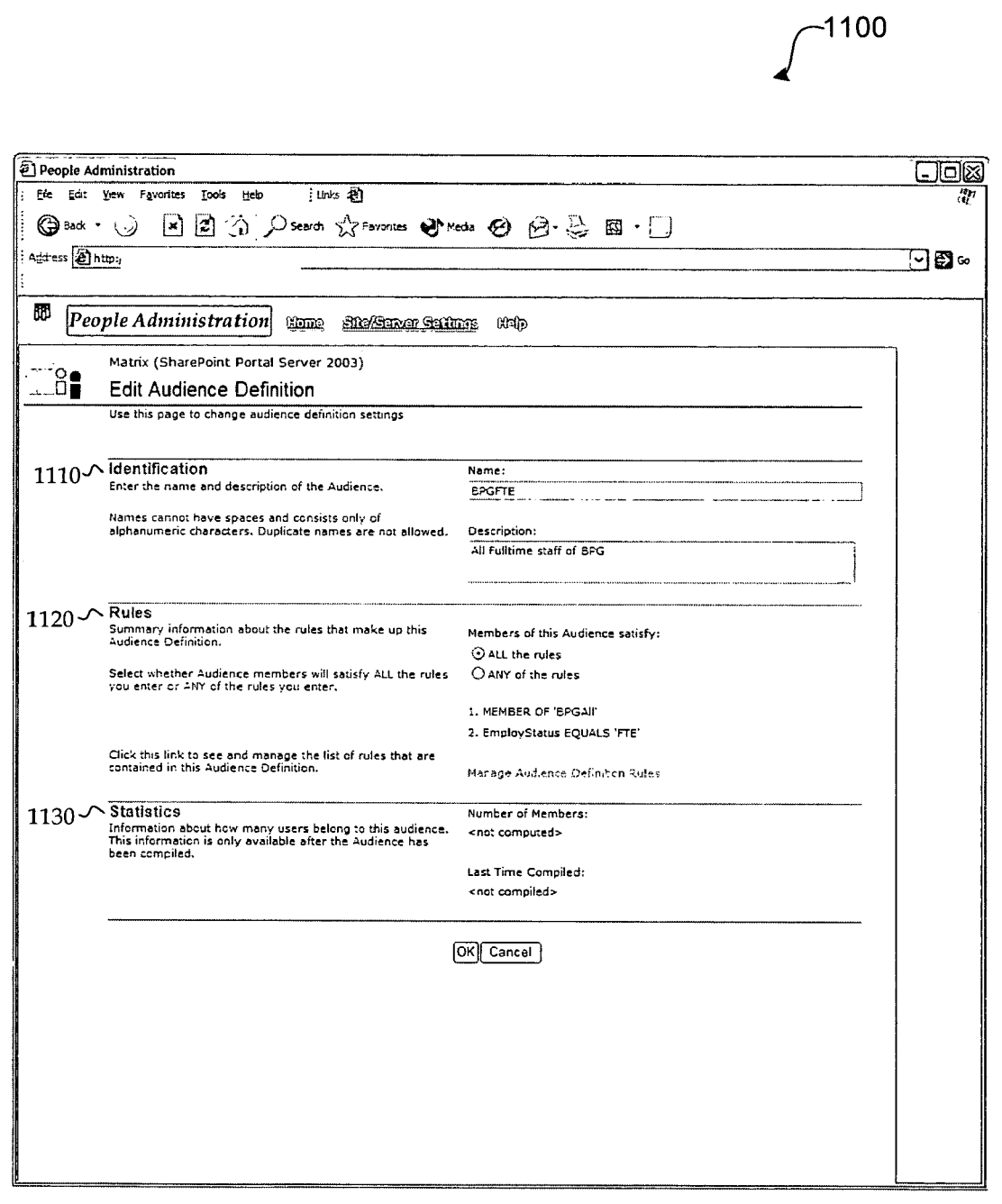

FIG. 11 illustrates an exemplary edit audience definition screen, in accordance with aspects of the invention. Edit audience definition screen 1100 identifies the rule in identification section 1110, shows a list of the rules in rules section 1120, and provides statistical information relating to the rule in statistics section 1130. According to one embodiment, the rules are listed on the page in a read only manner so that the user can see all the rules that make up the audience definition. The example audience definition (BPGFTE) includes rules to identify users who are member of 'BPGAIL" and are full time employees.

FIG. 12 shows an exemplary view audience membership screen, in accordance with aspects of the present invention. View audience membership screen 1200 shows the individuals that are members of audience BPGfte. Screen 1200 includes the members account name, preferred name, email, last compiled time, and number of members.

Figure 13:
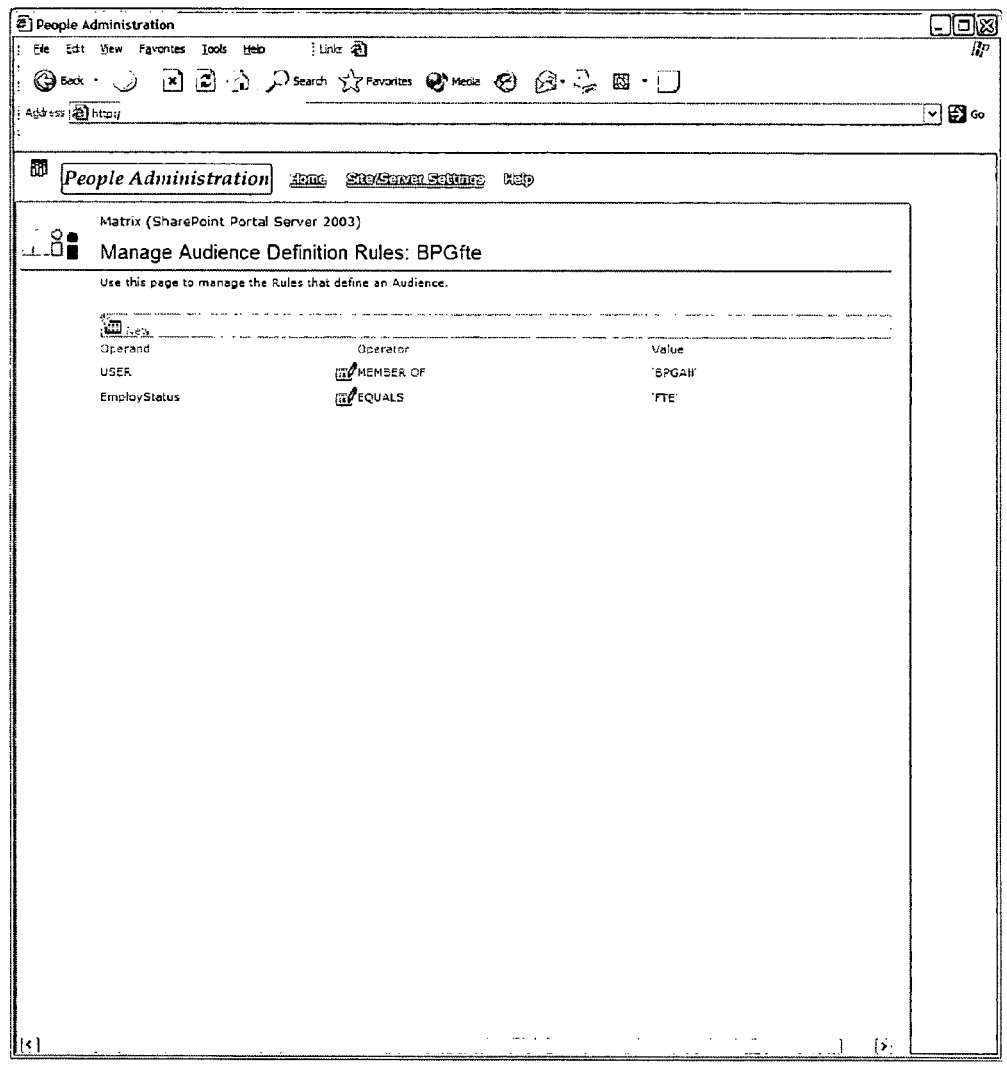
FIG. 13 illustrates an exemplary manage audience definition rules screen.

FIG. 13 illustrates an exemplary manage audience definition rules screen, in accordance with aspects of the present invention. Manage audience definition rules screen 1300 shows all of the rules that make up the Audience definition. Screen 1300 includes an operand column; operator column; and value column.

Figure 14:
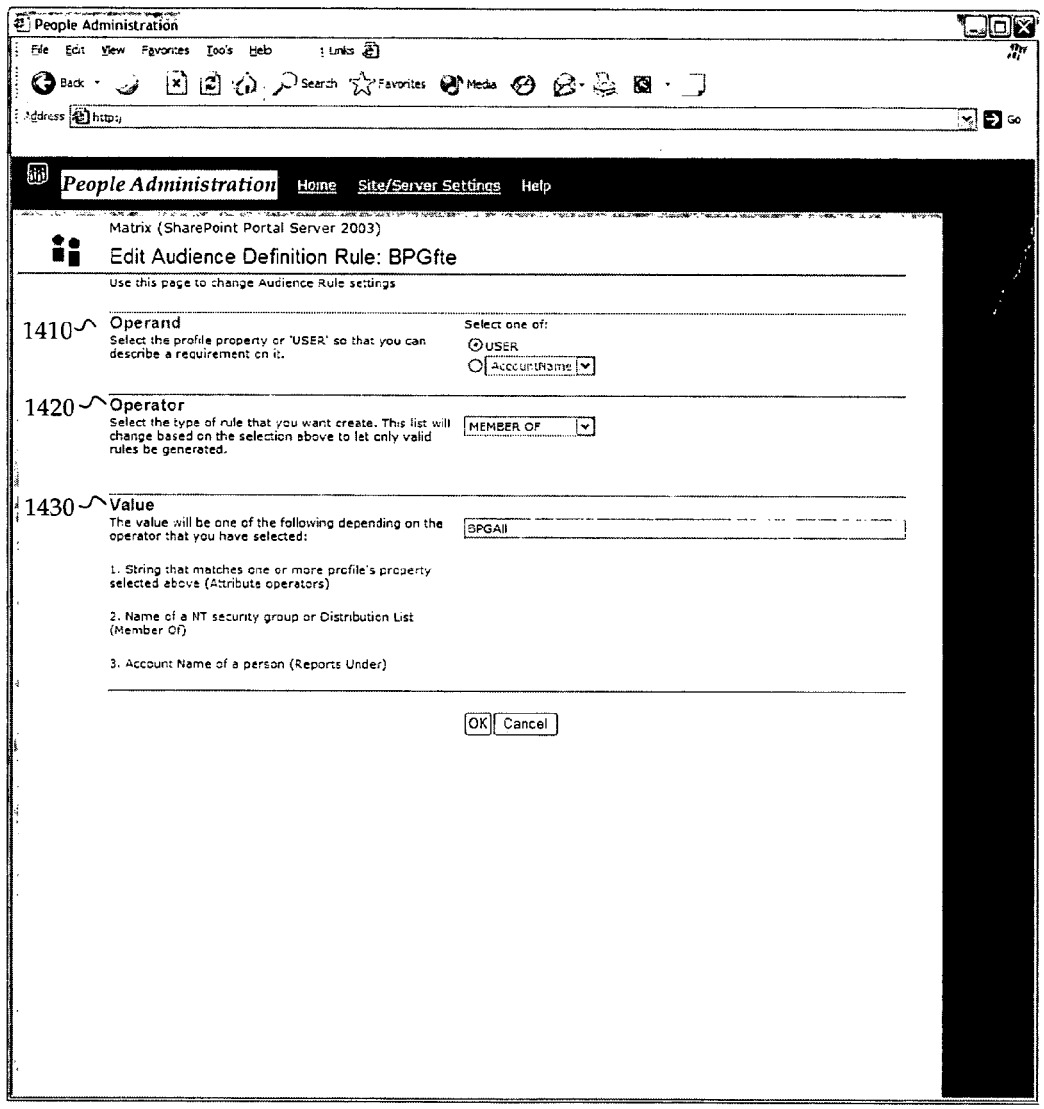
FIG. 14 shows an exemplary edit audience definition rules screen.

FIG. 14 shows an exemplary edit audience definition rules screen, in accordance with aspects of the invention. Edit audience definition rules screen 1400 shows a rule associated with the BPGfte audience. Screen 1400 includes operand section 1410, operator section 1420, and value section 1430. Screen 1400 is populated with the values from each audience rule.

Figure 15:
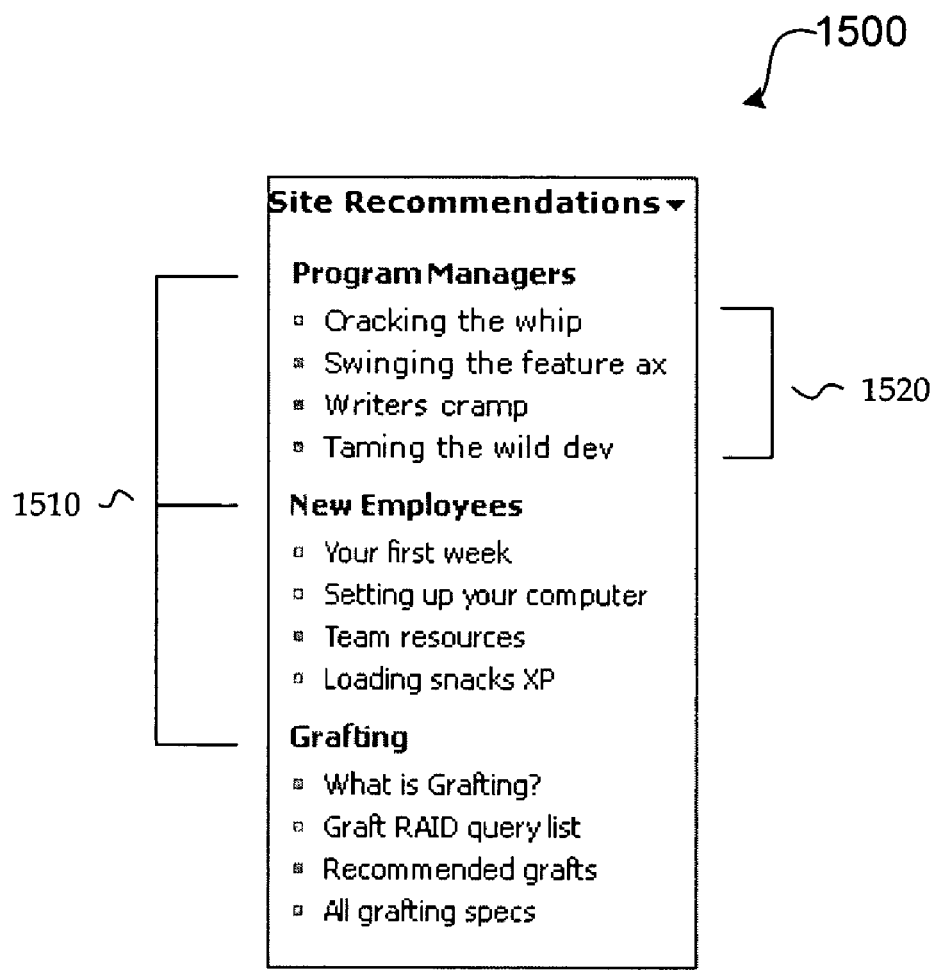
FIG. 15 illustrates an exemplary display showing targeted content, in accordance with aspects of the invention.

FIG. 15 illustrates an exemplary display showing targeted content, in accordance with aspects of the invention.

According to one embodiment, screen 1500 shows audience names as group headings with color and font (1510). The links associated with the targeted content are shown with a category listing title (1520). The number of listings for each of the audience headings can be customized. According to one embodiment, the default number of listings is five for each group heading and the listings are sorted in descending order by their modification date/time.

Each listing is annotated with the targeted audiences to which it is relevant. For example, in a training category, a given class may be a listing that is annotated as relevant to the program managers (PM) and the test targeted audiences.

In order to activate targeted content, a target to audience property is set. When the target to audience property set to empty or null, all users see the content when they access the page. Upon rendering screen 1500, the rendering engine makes a call to an API to determine what web parts to show to the user based on the audiences tagged to the content. For every heading that the return value is True, those parts are instantiated on screen 1500.

This audience property allows the administrator of the Portal to target specific content to particular groups of users. For instance, the New Employees section is automatically shown to all new employees. When the user is no longer a new employee this web part is not displayed to them. Since the rules for the audiences are compiled according to a predetermined schedule, the user will be automatically removed from the new employee audience after a period of time has elapsed.

The following scenarios are presented to further clarify content targeting, in accordance with aspects of the present invention.

Suppose that Vivica is a Software Tester at Microsoft. When she visits her Product Group's portal, she finds a content section showing here a summary of open problems in two views—Active problems opened by her and active problems assigned to her. Her friend Volga, an Event Marketer does not see this content section because she does not work in Vivica's group, but she sees a Marketing Effectiveness content section that tracks Marketing expense vs. Incoming leads.

Suppose that Vikram is a New Hire and a Software Developer at a major software company. When he visits the home page of the company's Internal training portal, he notices that it contains a list of recommended links that take him to the New Hire training category page and the Software Developer training category page. Vikram was automatically shown the content instead of having to navigate through a category tree to find the pages.

When Vikram visits the New Hire training category, he finds that the listings there are highlighted with recommended listings for a Software Developer. He is able to find the training that he is looking for in only a couple of clicks of visiting the home page.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for targeting content to an audience that comprises a plurality of users, the method comprising:
   receiving rules from an administration client computing device, the rules comprising query criteria for the audience, each rule defined as a unit of functionality;
   storing the received rules in a database;
   scheduling the compilation of the rules on a predetermined time schedule;
   using the received rules to determine a membership list of the plurality of users to receive the content, the received rules comprising a property query rule, a member of rule, and a reports under rule, by:
      independently generating separate results of the property query rule by determining if a property value matches a property of one or more of the plurality of users, including receiving the separate results of the property query rule from a directory service, wherein the directory service is separate from the database;
      independently generating separate results of the member of rule by determining if one or more of the plurality of users are a member of a pre-existing group email distribution list; and
      independently generating separate results of the reports under rule by determining if one or more of the plurality of users are located hierarchically under another person within an organization structure, the determination comprising receiving the separate results of the reports under rule from the directory service maintaining the organization structure; and
   after independently generating the separate results of each of the property query rule, the member of rule, and the reports under rule, compiling the membership list of users according to the predetermined schedule by applying one or more conditional logic operators to combine the separate results of the property query rule, the separate results of the member of rule, and the separate results of the reports under rule;
   associating the compiled membership list of users with content;
   obtaining the content from a data store; and
   providing the content to the users listed within the compiled membership list.

2. The method of claim 1, wherein the rules to define the audience further comprise an attribute; a member; and an organization.

3. The method of claim 1, wherein the content is provided within a web part.

4. The method of claim 1, wherein an organization structure is stored in the directory service.

5. The method of claim 1, wherein obtaining the content from a data store comprises accessing the content from one or more data servers.

6. The method of claim 1, wherein scheduling the compilation of the rules on a predetermined time schedule is processed as a SQL job by the database.

7. The method of claim 1, further comprising providing access to the content through a web interface that is created individually for that audience member.

8. The method of claim 1, further comprising storing the rules to define the audience as an XML representation.

9. A system for targeting content to an audience that comprises users, comprising:

a management client device coupled to a network of computing devices; and a server computer coupled to the management client device and the network of computer devices, wherein the server computer includes a processor and memory containing computer executable instructions defining a content targeting application, the content targeting application, when executed by the processor, operates to:

receive a plurality of rules from the management client device, the rules defining the audience, the rules comprising a property query rule, a member of rule and a reports under rule;

store the received rules in a database;

schedule the compilation of the rules on a predetermined time schedule;

independently generate separate results for the property query rule that determines if a property value matches a property of one or more users stored in a separate directory service;

independently generate separate results for the member of rule that determines if one or more users are within a pre-existing group email distribution list; and independently generate separate results for the reports under rule that determines if one or more users are located hierarchically under another user within the separate directory service;

compile the rules according to the predetermined time schedule to define the audience by combining the separate results of the property query rule, the separate results of the member of rule, and the separate results of the reports under rule with conditional logical operators; and associate the users of the audience with the content.

10. The system of claim 9, wherein at least one rule is selected from a set of rule types, including: an attribute based rule type; a member type; and an organizational rule type.

11. The system of claim 9, wherein the database schedules the compilation of the rules on predetermined time schedule.

12. The system of claim 9, wherein displaying the content further comprises displaying the content to the audience through a web interface.

13. A computer program product comprising computer executable instructions embodied in a hardware computer-readable storage media, the instructions comprising:

receiving a plurality of rules from an administrator client device;

storing the received rules in a database;

scheduling the compilation of the rules on a predetermined basis;

independently applying the plurality of rules to define an audience to receive the content, wherein the audience comprises a list of users, and the plurality of rules comprise:

a property query rule that independently determines if a property value matches a property of users in an organization structure stored in a directory service;

a member of rule that independently determines if a user is a member of an organization structure stored in a pre-existing group mail distribution list; and a reports under rule that independently determines if a user is located hierarchically under another user within an organization structure stored in the directory service;

compiling the rules according to the predetermined schedule by gathering information from the organization structure and the group mail distribution list to compile members of the audience wherein the compilation applies conditional logic operators to combine the results from the property query rule, the results from the member of rule and the results from the reports under rule; and associating the members of the audience with the content.

14. The computer storage medium of claim 13, wherein the rules are created from a set of rule types, including: an attribute based rule type; a member type; and an organizational rule type.

15. The computer storage medium of claim 13, wherein gathering information from the organization structure comprises invoking a directory service rules compiler.

16. The computer storage medium of claim 13, wherein gathering information further comprises accessing an active directory to obtain the organizational structure.

17. The computer storage medium of claim 13, wherein the database schedules the compilation of the rules on the predetermined basis.

18. The computer storage medium of claim 13, further comprising providing access to the content to the audience through a web interface.

* * * * *